United States Patent Office 3,047,606
Patented July 31, 1962

3,047,606
DIALKYL 1-CYANOVINYLPHOSPHONATES, THEIR PREPARATION, AND POLYMERS AND COPOLYMERS THEREOF
William S. Wadsworth, Jr., Elkins Park, Pa., assignor to Rohm & Haas Company, Philadelphia, Pa., a corporation of Delaware
No Drawing. Filed Dec. 1, 1958, Ser. No. 777,231
3 Claims. (Cl. 260—461)

This invention relates to dialkyl 1-cyanovinylphosphonates having the structure $$RCH=C-P(O)(OR_1)_2$$
$$\phantom{RCH=C-}|$$
$$\phantom{RCH=C-}CN$$

where R is hydrogen, an alkyl group of one to four carbon atoms, a $C_6H_5$ group, or a $C_6H_5CH=CH$ group, and $R^1$ is an alkyl group of one to four carbon atoms. It also relates to the preparation of said compounds and to polymers and/or copolymers formed therefrom. In such compounds phosphorus is linked directly to the vinyl moiety and the cyano group is in conjugation with the double bond.

These new compounds may be synthesized by condensing an aldehyde having the desired R group of the compound with a dialkyl cyanomethylphosphonate in the presence of a basic catalyst, thus $$RCHO+CH_2(CN)P(O)(OR^1)_2 \xrightarrow{\text{Base}}$$
$$RCH=C(CN)P(O)(OR^1)_2+H_2O$$

The condensation is preferably carried out in a polar solvent, such as methanol.

In the case where $R=H$, the monomer is not obtained directly but results from thermally cracking the polymer resulting from the condensation.

Dialkyl cyanomethylphosphonate used as a starting material in the aforesaid condensation is prepared by reacting the corresponding trialkyl phosphite with chloroacetonitrile, at relatively low temperature for a substantial period of time, the alkyl chloride being removed as it is formed.

The dialkyl 1-cyanovinylphosphonates above referred to, which are not β-substituted, polymerize, both free radically and anionically, to give clear, hard, flame retardant polymers. They also copolymerize with monomers, such as methyl methacrylate, styrene and the like, to produce hard, clear polymers with excellent flame retarding properties.

The dialkyl 1-cyanovinylphosphonates, which are β-substituted, copolymerize free radically with monomers of the type above referred to. The resulting copolymers are hard, clear polymers of good flame retardant properties.

Typical of compounds within the scope of this invention are the following:

$CH_2=C(CN)P(O)(OCH_3)_2$
Dimethyl 1-cyanovinylphosphonate
$CH_2=C(CN)P(O)(OC_2H_5)_2$
Diethyl 1-cyanovinylphosphonate
$CH_2=C(CN)P(O)(OC_4H_9)_2$
Dibutyl 1-cyanovinylphosphonate
$CH_3CH=C(CN)P(O)(OC_2H_5)_2$
Diethyl 2-methyl-1-cyanovinylphosphonate
$C_6H_5CH=C(CN)P(O)(OC_2H_5)_2$
Diethyl 2-phenyl-1-cyanovinylphosphonate
$C_6H_5CH=CH-CH=C(CN)P(O)(OCH_3)_2$
Dimethyl 2-cinnamyl-1-cyanovinylphosphonate
$C_6H_5CH=C(CN)P(O)(OC_3H_7)_2$
Diisopropyl 2-phenyl-1-cyanovinylphosphonate The following examples further illustrate specific embodiments of this invention:

EXAMPLE 1

*Preparation of Diethyl 1-Cyanovinylphosphonate*

Paraformaldehyde (8 g., 0.26 mole), 100 ml. of dry methanol and 10 drops of piperidine were refluxed together until the solution became homogeneous. The solution was made acidic by adding 40 drops of glacial acetic acid. Diethyl cyanomethylphosphonate (35.6 g., 0.2 mole) was added with stirring and the solution was refluxed for four hours. The alcohol was stripped off keeping the temperature below 65° C. Benzene (100 ml.) was added and water (1.0 ml.) removed by azeotrope. When water ceased coming off, 1.0 ml. of 86% phosphoric acid was added and the azeotrope resumed. A total of 3.4 ml. of water was collected. Benzene was stripped from the solution after water azeotrope had ceased, leaving a slightly viscous, water clear condensate.

The condensate was cracked under high vacuum (1.0 mm.) with the temperature increased gradually to 200° C. At this point decomposition set in and the heating was stopped. Approximately 35 g. of straw-colored distillate was collected which, when redistilled, gave 25.0 g. of water clear product at 63–65° C. (0.5 mm.).

Calculated for $C_7H_{12}O_3NP$: C, 44.44; P, 16.40; N, 7.40; H, 6.34. Found: C, 44.51; P, 16.52; N, 7.39; H, 6.41.

EXAMPLE 2

*Preparation of Diethyl 2-Phenyl-1-Cyanovinylphosphonate*

Benzaldehyde (106 g., 1.0 mole), diethyl cyanomethylphosphonate (178 g., 1.0 mole), 5.0 ml. of a saturated solution of sodium ethoxide in ethanol and 150 ml. of benzene were charged to a reaction flask fitted with a Dean Stark water separator. Water (7.0 ml.) was azeotroped from the mixture which was brought to reflux. When water azeotrope had ceased, the mixture was distilled yielding 64.0 g. of product at 165–165° C. (at 0.5 mm.).

Calculated for $C_{13}H_{16}O_3NP$: C, 58.86; P, 11.70; N, 5.28; H, 6.04. Found: C, 59.02; P, 11.97; N, 5.31; H, 6.07.

In a similar manner, diethyl β-cinnamyl-1-cyanovinylphosphonate, with a boiling point of 194–198° C. (at 0.35 mm.), is prepared by using equimolecular amounts of cinnamaldehyde and diethyl cyanomethylphosphonate.

EXAMPLE 3

*Preparation of Copolymer of Diethyl 1-Cyanovinylphosphonate and Methyl Methacrylate*

To a solution containing diethyl 1-cyanovinylphosphonate and methyl methacrylate in a 1–4 mole ratio was added 0.01% by weight of benzoyl peroxide. The solution was placed in a tightly stoppered container and heated at 80° C. for two hours. A hard, clear copolymer resulted which showed excellent flame retarding properties, taking over four times as long to ignite when held in a Bunsen burner flame as did polymethyl methacrylate.

EXAMPLE 4

*Preparation of Copolymer of Diethyl 2-Phenyl-1-Cyanovinylphosphonate and Styrene*

To a solution containing diethyl 2-phenyl-1-cyanovinylphosphonate and styrene in approximately a 1 to 1 molar ratio there was added 0.01% azoisobutyronitrile. This solution, in a closed container, was heated at 60° C. for two hours. There resulted a hard, clear polymer which required approximately three times as long to ignite as did polystyrene when a flame was applied thereto.

The compounds of this invention are useful monomers for polymerization and/or copolymerization with other monomers having a terminally located vinylidene group, for example, acrylic and methacrylic acids, esters, nitriles, styrene and the like to yield flame-resistant plastics, coating and finishes for textiles, leather, etc.

I claim:

1. A process for preparing a compound of the formula

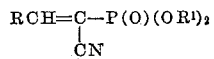

wherein R is a member of the class consisting of an alkyl group of one to four carbon atoms, a $C_6H_5$ group, and a $C_6H_5CH=CH$ group, and $R^1$ is an alkyl group of one to four carbon atoms, which comprises reacting together, while in intimate contact with a basic catalyst, an aldehyde, RCHO, and a compound of the formula $$CH_2(CN)P(O)(OR^1)_2$$

wherein R and R', respectively, are as defined above.

2. A process for preparing diethyl 2-phenyl-1-cyanovinylphosphonate which comprises reacting together, while in intimate contact with a basic catalyst, benzaldehyde and diethyl cyanomethylphosphonate.

3. A process for preparing diethyl β-cyannamyl-1-cyanovinylphosphonate which comprises reacting together, while in intimate contact with a basic catalyst, cinnamaldehyde and diethyl cyanomethylphosphonate.

References Cited in the file of this patent

UNITED STATES PATENTS

| | | |
|---|---|---|
| 2,550,651 | Dickey et al. | Apr. 24, 1951 |
| 2,566,194 | Hagemeyer et al. | Aug. 28, 1951 |
| 2,721,876 | Dickey et al. | Oct. 25, 1955 |
| 2,754,320 | Johnston | July 10, 1956 |
| 2,780,616 | Dickey et al. | Feb. 5, 1957 |
| 2,920,097 | Frazza et al. | Jan. 5, 1960 |